United States Patent [19]

Newman

[11] Patent Number: 5,198,183
[45] Date of Patent: Mar. 30, 1993

[54] METHOD AND APPARATUS FOR CLOSE PACKING OF NUCLEAR FUEL ASSEMBLIES

[75] Inventor: Darrell F. Newman, Richland, Wash.

[73] Assignee: Battelle Memorial Institute, Richland, Wash.

[21] Appl. No.: 847,456

[22] Filed: Mar. 6, 1992

[51] Int. Cl.$^5$ .............................................. G21C 7/06
[52] U.S. Cl. ................................. 376/272; 376/327; 376/447
[58] Field of Search .............. 376/272, 327, 449, 419, 376/339, 463, 447

[56] References Cited

U.S. PATENT DOCUMENTS

| | | | |
|---|---|---|---|
| 3,008,884 | 11/1961 | Schippereit et al. | 376/327 |
| 4,024,406 | 5/1977 | Bevilacqua | 376/272 |
| 4,203,038 | 5/1980 | Takhashi et al. | 376/272 |
| 4,225,467 | 9/1980 | McMurtry et al. | 376/327 |
| 4,441,242 | 4/1984 | Hicken et al. | 376/272 |
| 4,567,015 | 1/1986 | Rossard | 376/272 |
| 4,610,893 | 9/1986 | Eriksson et al. | 376/327 |
| 4,659,535 | 4/1987 | Couture et al. | 376/272 |
| 4,714,583 | 12/1987 | Wachter | 376/272 |
| 4,731,219 | 3/1988 | Beneck et al. | 376/272 |
| 4,780,268 | 10/1988 | Papai et al. | 376/272 |

OTHER PUBLICATIONS

ORNL/CSD/TM-150, A Summary Report on Optimized Designs . . . , JA Bucholz, Oak Ridge National Laboratory, Apr. 1983.
Criticality Control of Packagings Designed . . . , R. Cagnon, P. Morin, M. Labrousse, PATRAM '83, CONF-830528–vol. 2, ORNL Dec. 1983.
Nuclear Criticality Safety Considerations . . . , SE Turner, ASME 83-NE-6, May 1983.
Criticality-Control Concepts . . . , AH Wells, American Nuclear Society, vol. 45, ISSN: 0003–18x Nov. 1983.
Feasibility and Incentives for Consideration . . . , TL Sanders, RM Westerfall, RH Jones, Sandia Nat. Lab. SAND 87-0151, Aug. 1987.

*Primary Examiner*—Daniel D. Wasil
*Attorney, Agent, or Firm*—Paul W. Zimmerman

[57] ABSTRACT

The apparatus of the present invention is a plate of neutron absorbing material. The plate may have a releasable locking feature permitting the plate to be secured within a nuclear fuel assembly between nuclear fuel rods during storage or transportation then removed for further use or destruction.

The method of the present invention has the step of placing a plate of neutron absorbing material between nuclear fuel rods within a nuclear fuel assembly, preferably between the two outermost columns of nuclear fuel rods. Additionally, the plate may be releasably locked in place.

8 Claims, 2 Drawing Sheets

METHOD AND APPARATUS FOR CLOSE PACKING OF NUCLEAR FUEL ASSEMBLIES

This invention was made with Government support under Contract DE-AC06-76RLO 1830 awarded by the U.S. Department of Energy. The Government has certain rights in the invention.

FIELD OF THE INVENTION

The present invention relates generally to an apparatus and method for close packing of nuclear fuel assemblies. More specifically, the present invention relates to placement of at least one neutron absorbing plate between columns of nuclear fuel rods within a nuclear fuel assembly.

BACKGROUND OF THE INVENTION

In the nuclear power industry, storage and transportation of nuclear fuel assemblies is complicated by having to "nuclearly" isolate portions of nuclear fuel from other portions in order to avoid conditions of criticality which could lead to an uncontrolled nuclear chain reaction. Nuclear fuel assemblies are made up of fuel rods supported in a rack structure and separated with grid spacers. Interspersed within the fuel rod matrix are control rod guide tubes.

Nuclear isolation in storage and transportation is presently done in three ways; (1) placing neutron absorbing material between nuclear fuel assemblies, or by placing nuclear fuel assemblies into neutron absorbing baskets, (2) dismantling the nuclear fuel assembly and consolidating fuel rods into close packed arrays, and (3) relying on "burnup" or depletion of fuel to allow close packing of nuclear fuel assemblies without interposing neutron absorbing material.

Each method has inherent disadvantages. Placement of neutron absorbing material between nuclear fuel assemblies or placement of nuclear fuel assemblies into baskets increases the volume required for storage or transportation of multiple nuclear fuel assemblies. Moreover, use of a basket imposes a fixed amount of neutron absorbing material whether the assembly is fresh or spent. Consolidation of nuclear fuel assemblies is limited because the operation must be done under water such as in a spent fuel pool. Relying on burnup precludes close storage or transportation of new or partially spent nuclear fuel assemblies. In addition, there is a risk that a spent nuclear fuel assembly is not as "spent" as expected.

It would be advantageous to closely pack nuclear fuel assemblies by eliminating neutron absorbing material placed between nuclear fuel assemblies, without having to consolidate them and using only enough neutron absorbing material appropriate for the status of a particular nuclear fuel assembly. The present invention offers just such a solution.

SUMMARY OF THE INVENTION

The present invention relates generally to an apparatus and method for close packing of nuclear fuel assemblies. More specifically, the present invention relates to placement of at least one neutron absorbing plate between columns of nuclear fuel rods within a nuclear fuel assembly.

The apparatus of the present invention is a plate of neutron absorbing material. The plate may have a releasable locking feature permitting the plate to be secured within a nuclear fuel assembly between nuclear fuel rods during storage or transportation, then removed for further use or destruction of the nuclear fuel assembly.

The method of the present invention has the step of placing a plate of neutron absorbing material between nuclear fuel rods within a nuclear fuel assembly, preferably between the two outermost columns of nuclear fuel rods. Additionally, the plate may be releasably locked in place.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
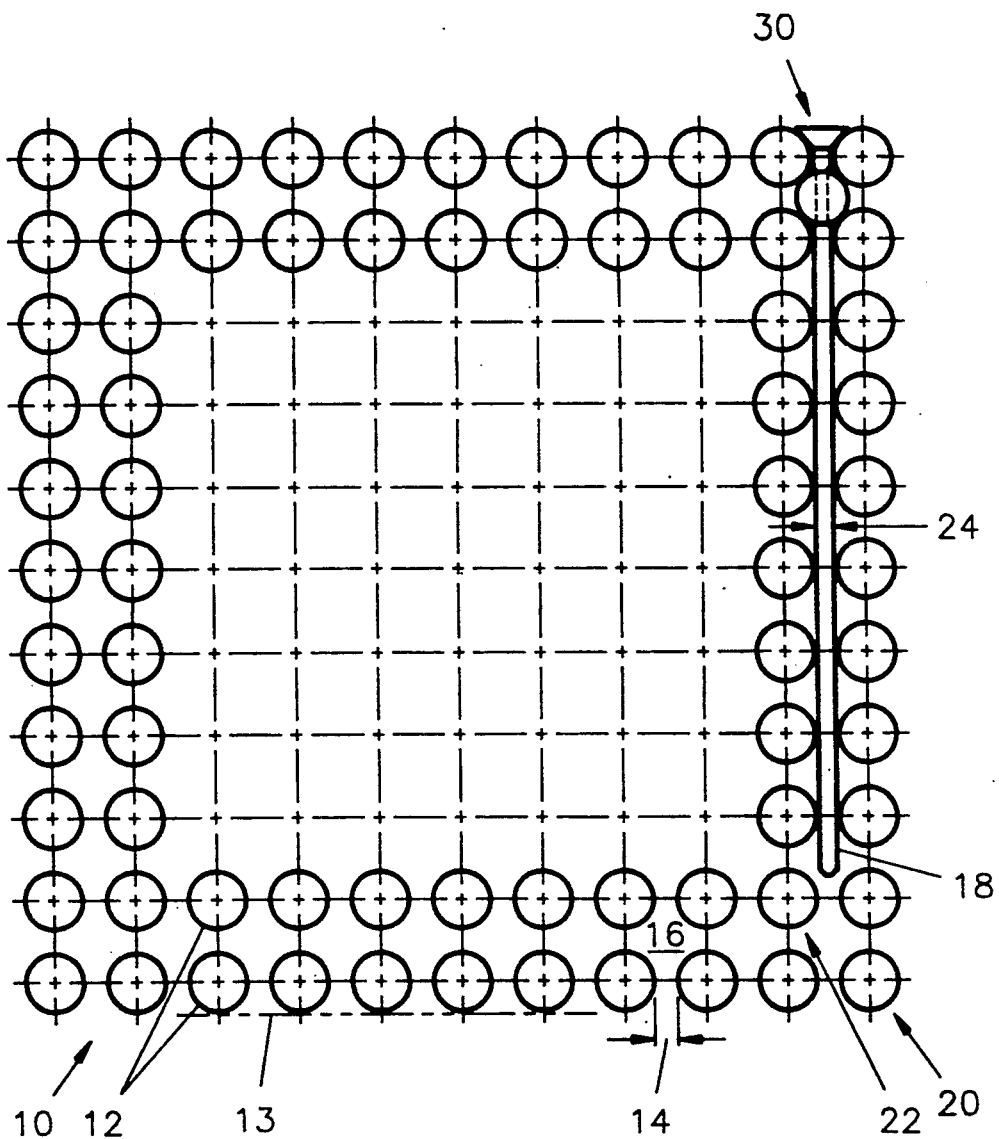
FIG. 1 is a simplified cross section of a nuclear fuel assembly.

The present invention shown in FIG. 1 is an apparatus for close packing of nuclear fuel assemblies. A nuclear fuel assembly (10) has an array of fuel rods (12) evenly spaced within an envelope (13) with narrow spaces (14) and wider spaces (16) between the fuel rods (12). Close packing of nuclear fuel assemblies (10) is accomplished by inserting a plate (18), having an effective amount of neutron absorbing material, between fuel rods (12) within the nuclear fuel assembly (10). It is preferred that the plate (18) is placed between an outer row (20) and a next outer row (22) of fuel rods (12). Placement of the plate (18) may be between any rows of the nuclear fuel assembly (10) where there are no interfering guide tubes (such as may be found in boiling water reactor assemblies).

The number of plates (18) placed within an assembly (10) may depend upon the burnup status or reactivity of the fuel. Fresh fuel may require that plates (18) completely surround and enclose the center of the nuclear fuel assembly. Spent fuel may require plates on one side or a few plates (18) on all sides appropriate for the activity of the spent fuel.

The plates (18) may be of any thickness but preferably have a thickness (24) permitting insertion between nuclear fuel rods (12) within the nuclear fuel assembly (10). Moreover, it is preferred that the plate (18) has a width and a length permitting insertion between grid spacers and other structural elements within said nuclear fuel assembly.

The apparatus may further include a releasable lock (30) for securing the plate (18) within the nuclear fuel assembly (10). The releasable lock (30) may be of any type but it is preferred to be operable under water using spent fuel handling tools. These tools are required to reach up to 40 ft. underwater manipulated by an operator on a platform above the water surface. Hence, the operator has poor visibility of the nuclear fuel assemblies beneath the water surface and must rely on the feel of a tool in knowing whether a task is successfully completed.

Therefore, it is preferred that the releasable lock (30) is attached to the plate (18) and actuated by a simple linear or rotary motion. The releasable lock (30) may have flexible elements, rigid elements, or a combination of rigid and flexible elements. It is further preferred that the releasable lock (30) remain within the fuel assembly envelope (13) when engaged thereby permitting a fuel assembly (10) to touch either a container wall or another fuel assembly. Maintaining the releasable lock (30) within the envelope (13) further prevents catching or snagging the releasable lock (30) on other structures during handling of the fuel assembly (10).

Releasable locks (30) with a flexible element include but are not limited to locks having a spring or a pressurized element. The releasable lock (30) may be a spring clip that engages a nuclear fuel rod when the plate (18) is inserted into the nuclear fuel assembly. The force required to engage the clip would be felt by the operator.

A further embodiment of a flexible releasable lock (30) comprises a flexible element compressibly inserted through a narrow space (14) between nuclear fuel rods then expanded into a wide space (16) between nuclear fuel rods.

Flexible elements include but are not limited to tapered spring elements, springs attached to tapered elements, and spiral springs. Flexible elements further include pressurized and energized elements including but not limited to pneumatic cylinders, hydraulic cylinders, and electrical solenoids. An advantage of flexible elements is that the additional force required to actuate them provides the feel that the operator needs to know the status of the lock.

Figure 2:
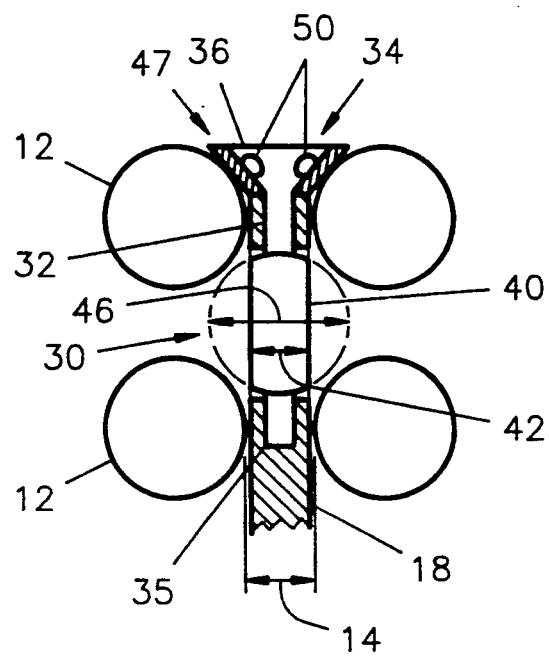
FIG. 2 is a top view of a rigid releasable lock.
Figure 3:
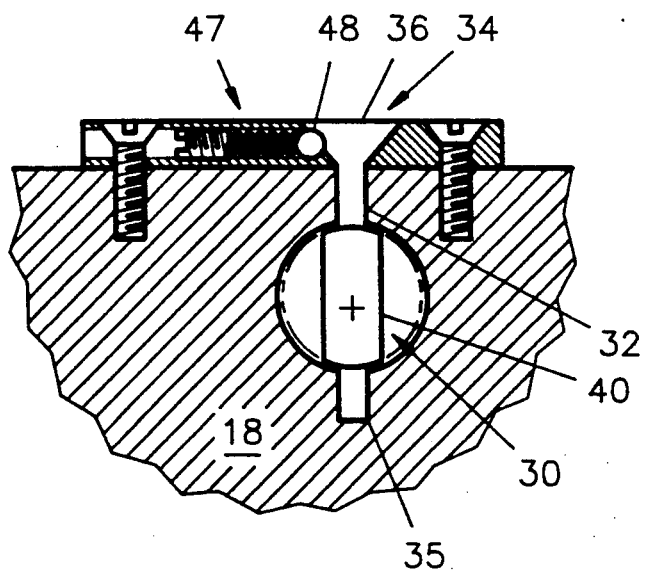
FIG. 3 is a left side view of a rigid releasable lock.

Releasable locks (30) having rigid elements may also be used. A preferred embodiment of a rigid releasable lock (30) is illustrated in FIGS. 2 and 3. The rigid releasable lock (30) in these figures comprises an elongated member (32) having a first end (34) and a second end (35). The first end (34) has a key (36), and the second end (35) is rotatably attachable to the plate (18). The key (36) may be of any shape, but is preferably shaped to interface with a remotely operated handling tool to rotate the elongated member (32) for locking and releasing the plate (18).

A locking disk (40) is attached on the elongated member (32) between the key (36) and said second end, (35) and has a thickness (42) less than the narrow space (14) between said fuel rods (12) and has a width (46) greater than the narrow space (14). The thickness (42) of the locking disk (40) permits the locking disk (40) to be inserted between nuclear fuel rods (14), then locked between them by rotating the locking disk (40) within the wide space (16) with the key (36) so that the width (46) of the locking disk (40) prevents its removal from between the nuclear fuel rods (14).

The rigid releasable lock (30) may be secured in either a locked position or an open position with a retainer (47). In a preferred embodiment, the retainer (47) comprises at least one ball detent (48) mounted on an end of the plate (18) near the key (34) with the ball (48) in contact with the key (34). The key (34) is held in position when the ball (48) rests in a depression (50) on the key (34).

A further embodiment of a retainer (47) is a slotted key with a flat spring. The flat spring is mounted on an end of the plate (18) with a surface pressing on the key (34). The slots in the key (34) may be tapered and rounded to facilitate reversible actuation of the releasable lock (30). Upon rotation of the key (34), a slot will align with the flat spring thereby restraining the key (34) from rotating until additional torque is applied.

The plate (18) may be of any neutron absorbing material, but it is preferred to use a structural metal, compatible with the water chemistry in storage pools such as aluminum or stainless steel, alloyed or clad with a neutron absorbing material including but not limited to boron, cadmium, and hafnium. A plate (18) has an effective amount of neutron absorbing material when the concentration of the alloying neutron absorbing material is within standard alloying practice of, for example, up to 4 weight percent boron in aluminum or up to 2 weight percent boron in stainless steel. The structural or cladding metal may be any metal compatible with the water chemistry in spent fuel storage pools including but not limited to aluminum, and stainless steel.

The thickness (22) of the plate (18) may depend upon the amount of neutron absorbing material, but is preferred to be about the same as plates currently used between nuclear fuel assemblies (10). By using plates (18) which are similar to those already in use, the resulting control of neutrons will also be similar.

In operation, close packing of nuclear fuel assemblies (10) is permitted by placing a plate (18) having an effective amount of neutron absorbing material between nuclear fuel elements (12) within a nuclear fuel assembly (10). Placing a plate (18) within a nuclear fuel assembly (10) allows multiple nuclear fuel assemblies to touch, thereby minimizing the volume necessary for storing or transporting multiple nuclear fuel assemblies.

The plate (18) may be releasably locked within the nuclear fuel assembly (10) thereby ensuring that the plate (18) stays in place.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for close packing of nuclear fuel assemblies, wherein a nuclear fuel assembly has an array of nuclear fuel rods spaced within an envelope with narrow spaces and wider spaces therebetween, said apparatus comprising:
    (a) said nuclear fuel assembly, and
    (b) a plate having an effective amount of neutron absorbing material, said plate further having a thickness permitting insertion within said envelope and between said nuclear fuel rods within said narrow spaces, and having a width and length permitting insertion between any grid spacers within said nuclear fuel assembly.

2. An apparatus as recited in claim 1, further comprising:
    (a) a releasable lock on said plate.

3. An apparatus as recited in claim 2, wherein said releasable lock is a rigid lock comprising:
    (a) an elongated member having first and second ends, said first end having a key, said second end rotatably attachable to said plate,
    (b) a locking disk attached on said elongated member between said key and said second end, and having a thickness less than a shortest distance between said fuel rods and having a width greater than said shortest distance, (c) whereby said thickness of said locking disk permits said disk to be inserted between said nuclear fuel rods then locked between said nuclear fuel rods by rotating said locking disk with said key so that said width of said locking disk prevents removal of said locking disc between said nuclear fuel rods.

4. An apparatus as recited in claim 3, further comprising:
(a) a retainer attached to an end of said plate near said key and containing said key.

5. A method for close packing of nuclear fuel assemblies, wherein a nuclear fuel assembly has an array of nuclear fuel rods spaced within an envelope with narrow spaces and wider spaces therebetween, said method comprising the steps of:
(a) making a plate having an effective amount of neutron absorbing material, said plate further having a thickness permitting insertion within said envelope and between said nuclear fuel rods within said narrow spaces, and having a width and length permitting insertion between any grid spacers within said nuclear fuel assembly, and
(b) said plate between said nuclear fuel rods within said envelope of said nuclear fuel assembly.

6. A method as recited in claim 5, further comprising:
(a) releasably locking said plate within said fuel assembly.

7. An apparatus for close packing of nuclear fuel assemblies, wherein a nuclear fuel assembly has an array of nuclear fuel rods spaced within an envelope with narrow spaces and wider spaces therebetween, said apparatus comprising:
(a) a plate having an effective amount of neutron absorbing material,
(b) a releasable lock having
(c) an elongated member having first and second ends, said first end having a key, said second end rotatably attachable to said plate,
(d) a locking disk attached on said elongated member between said key and said second end, and having a thickness less than said narrow space between said fuel rods and having a width greater than said narrow space,
(e) whereby said plate is placed within said envelope and said thickness of said locking disk permits said disk to be inserted between said nuclear fuel rods then locked between said nuclear fuel rods by rotating said locking disk with said key so that said width of said locking disk prevents removal of said locking disc between said nuclear fuel rods.

8. An apparatus as recited in claim 7, further comprising:
(a) a retainer attached to an end of said plate near said key and contacting said key.

* * * * *